(12) United States Patent
Stamler

(10) Patent No.: US 7,225,832 B2
(45) Date of Patent: Jun. 5, 2007

(54) FIVE VALVE MANIFOLD WITH ANGLE BONNET DETAILS

(75) Inventor: Edward Stamler, Calgary (CA)

(73) Assignee: Phoenix Precision, Alberta (CA)

( * ) Notice: Subject to any disclaimer, the term of this patent is extended or adjusted under 35 U.S.C. 154(b) by 221 days.

(21) Appl. No.: 11/184,019

(22) Filed: Sep. 1, 2004

(65) Prior Publication Data

US 2006/0225792 A1    Oct. 12, 2006

(51) Int. Cl.
*F16K 11/20*    (2006.01)
(52) U.S. Cl. ..................................... 137/597
(58) Field of Classification Search ............... 137/594, 137/597 I, 606, 599.06, 599.07
See application file for complete search history.

(56) References Cited

U.S. PATENT DOCUMENTS

| | | | | |
|---|---|---|---|---|
| 4,182,362 A | * | 1/1980 | Hewson et al. | 137/340 |
| 4,193,420 A | * | 3/1980 | Hewson | 137/356 |
| 4,306,587 A | * | 12/1981 | Tchebinyayeff | 137/606 |
| 4,938,246 A | * | 7/1990 | Conley et al. | 137/15.07 |
| 5,036,884 A | * | 8/1991 | Miller et al. | 137/597 |
| 5,277,224 A | | 1/1994 | Hutton et al. | |
| 5,823,228 A | | 10/1998 | Chou | |
| 5,988,203 A | * | 11/1999 | Hutton | 137/271 |
| RE38,034 E | | 3/2003 | Chou | |

FOREIGN PATENT DOCUMENTS

GB    2143304 A  *  2/1985

* cited by examiner

*Primary Examiner*—Stephen M. Hepperle
(74) *Attorney, Agent, or Firm*—Stevens, Davis, Miller & Mosher, LLP

(57) ABSTRACT

A multi-valve manifold is provided, including a valve body having a periphery about which are placed a series of valves. At least one of the series of valves fits within a depression in the valve body.

20 Claims, 3 Drawing Sheets

FIVE VALVE MANIFOLD WITH ANGLE BONNET DETAILS

BACKGROUND OF THE INVENTION

1. Field of the Invention

The invention relates to the field of five valve manifolds and the attached assembly drawings show the general arrangement of two types of five valve manifolds incorporating angle bonnet features according to the invention.

2. Description of the Related Art

Drawing FIGS. 3, 3a, 4 and 4a show the same type of five valve manifold valve with the conventional arrangement of the valve bonnets, wherein:

FIGS. 3 and 3a show a five valve, flange by pipe manifold with the equalizer and vent valves located on the front face of the manifold.

FIGS. 4 and 4a show a five valve, flange by flange manifold with the equalizer and vent valves located on the front face of the manifold.

BRIEF SUMMARY OF THE INVENTION

The general type of manifold is used in flow measurement applications in a variety of industries, including oil and gas, petrochemical, water treatment and power production. The manifold valve is installed between the primary flow measurement element (an orifice plate or similar) and the transmitter. The purpose of the primary element is to cause a pressure drop in the pipeline. There is a relationship between the size of the pressure differential caused by the primary element and the flow through the pipeline. A transmitter, typically an electronic device, measures the pressure differential. However, the conventional positioning of the valves on and normal to a front face of the prior art manifolds requires the valve handles to be small in order not to interfere with one another and makes those handles difficult to turn by hand. The present invention overcomes these difficulties by positioning some of the valves in depressions such that the valves are not normal to the front face.

DETAILED DESCRIPTION OF THE PREFERRED EMBODIMENTS

In such an installation as described above for flow measurement applications, there are two independent passages from the primary element through the manifold valve to the transmitter. One passage 11 is from the high pressure side of the primary element and the other passage 13 is from the low pressure side of the primary element. Two isolation or block valves (12, 14, respectively, one on each of the high side and low side) are located within the manifold to allow the transmitter (not shown) to be isolated from the pipeline. In all the drawings attached according to embodiments of the invention the isolation/block valves 12, 14 are located on the sides of the manifold.

Figure 3A:
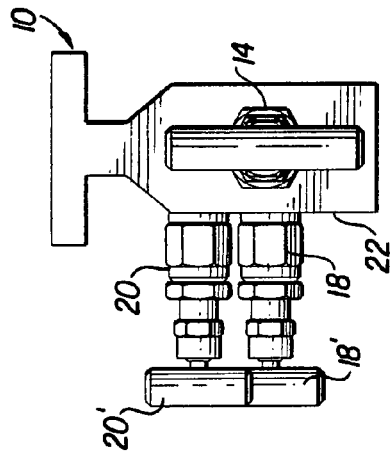
FIG. 3a is a right side view of the prior art manifold of FIG. 3.
Figure 3:
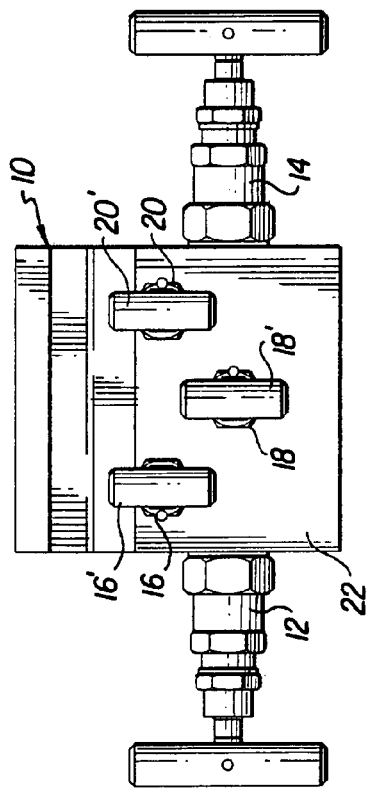
FIG. 3 is an elevation view of a prior art flange by pipe five valve manifold.
Figure 4:
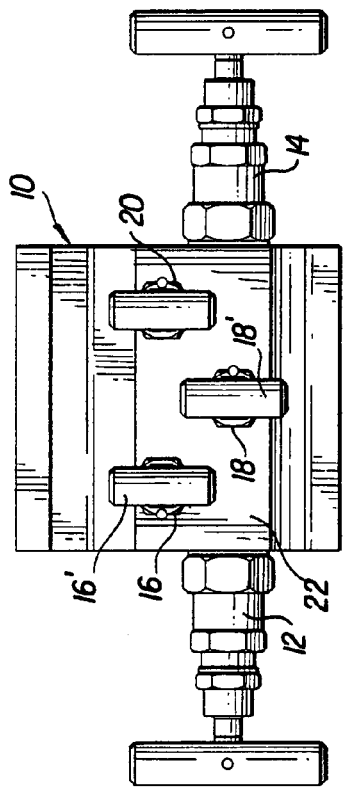
FIG. 4 is an elevation view of a prior art flange by flange five valve manifold.

The other three valves 16, 18, 20 in a five valve manifold are typically located on the front face 22 of the manifold body (see prior art drawings FIGS. 3–4). These valves 16, 18, 20 are either used as equalizer valves or vent valves. Five valve manifold can have either 2 equalizer valves and one vent valve, or one equalizer valve and two vent valves.

The equalizer valve(s) are used to control communication between the high pressure side passage 11 and the low pressure side passage 13. When the transmitter is measuring differential pressures the high side and the low side are isolated from each other and thus the equalizer valves are closed. When it is necessary to calibrate the transmitter the equalizer valves are opened, allowing the high side and the low side to be connected. The pressure on both sides is now equalized and the transmitter can be zeroed and calibrated.

The vent valve(s) is used to process fluid to be vented, either to bleed off pressure or to bleed off unwanted accumulations of air, gas or other fluids that would affect the pressure measurement.

In the currently available manifolds of this type these three valves (the equalizer and vent valves) are located on the face 22 of the manifold 10. FIGS. 3–3a and 4–4a show this arrangement. The industry standard spacing between the high pressure side and the low pressure of the primary flow measurement element is $2\frac{1}{8}$", center to center. This standard spacing imposes constrains on the location of the equalizer/vent valves 16, 18, 20 and forces those valves 16, 18, 20, when located on the face 22 of the manifold 10 to be quite close together. This in turn requires that the handles 16', 18', 20' on those individual valves 16, 18, 20 to be quite small in order to prevent the handles from interfering with each other. These manifold valve handles 16', 18', 20' are hand operated. The close spacing of the equalizer/vent valves 16, 18, 20 does not allow much room for hand operation of the vent/equalizer valve handles 16', 18, 20'. Further the need for small handles 16', 18', 20' makes those valve handles 16', 18', 20' more difficult to turn by hand.

Figure 1:
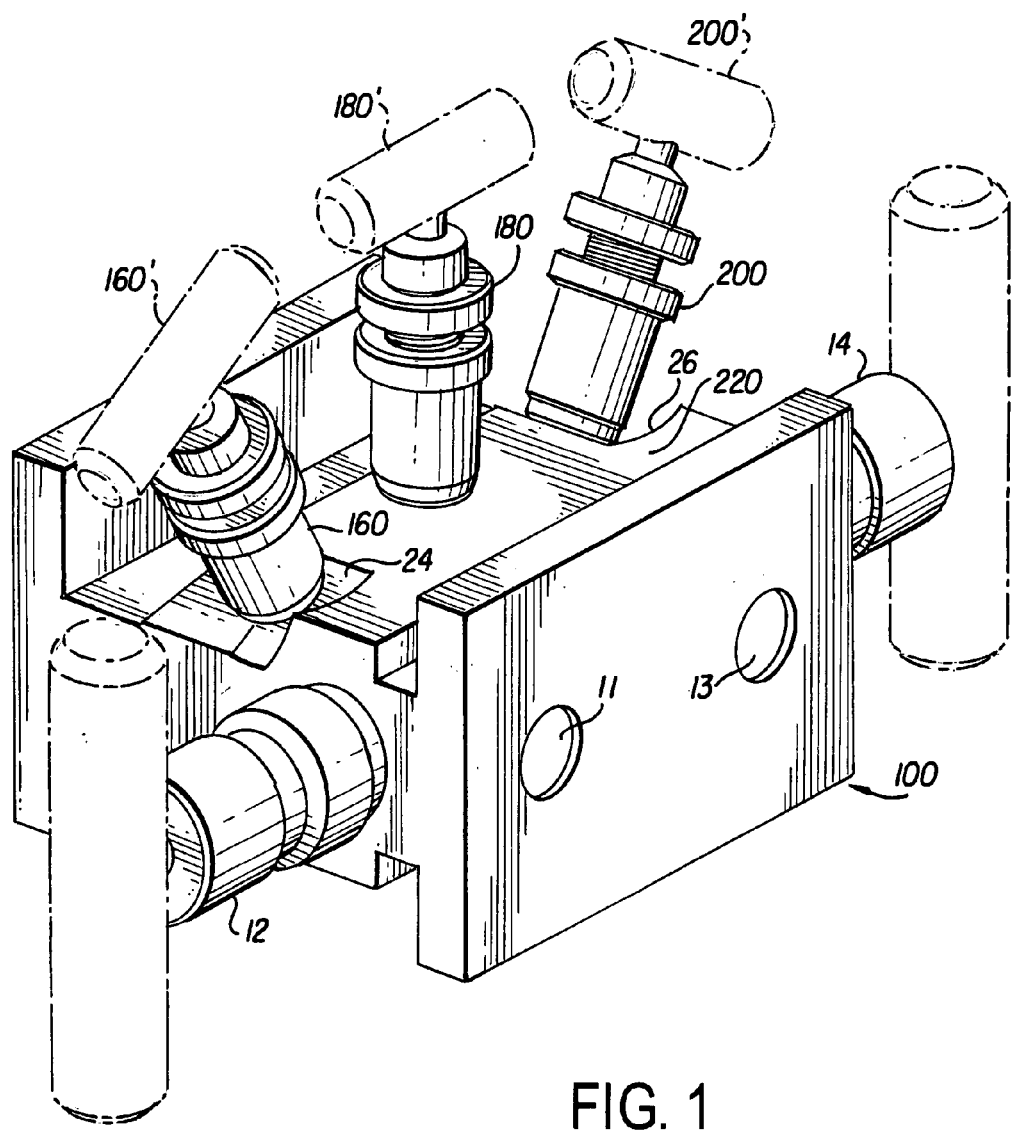
FIG. 1 schematically illustrates a perspective view of one embodiment of the invention of a five valve manifold of the flange by flange type having a general "I-shape"
Figure 2:
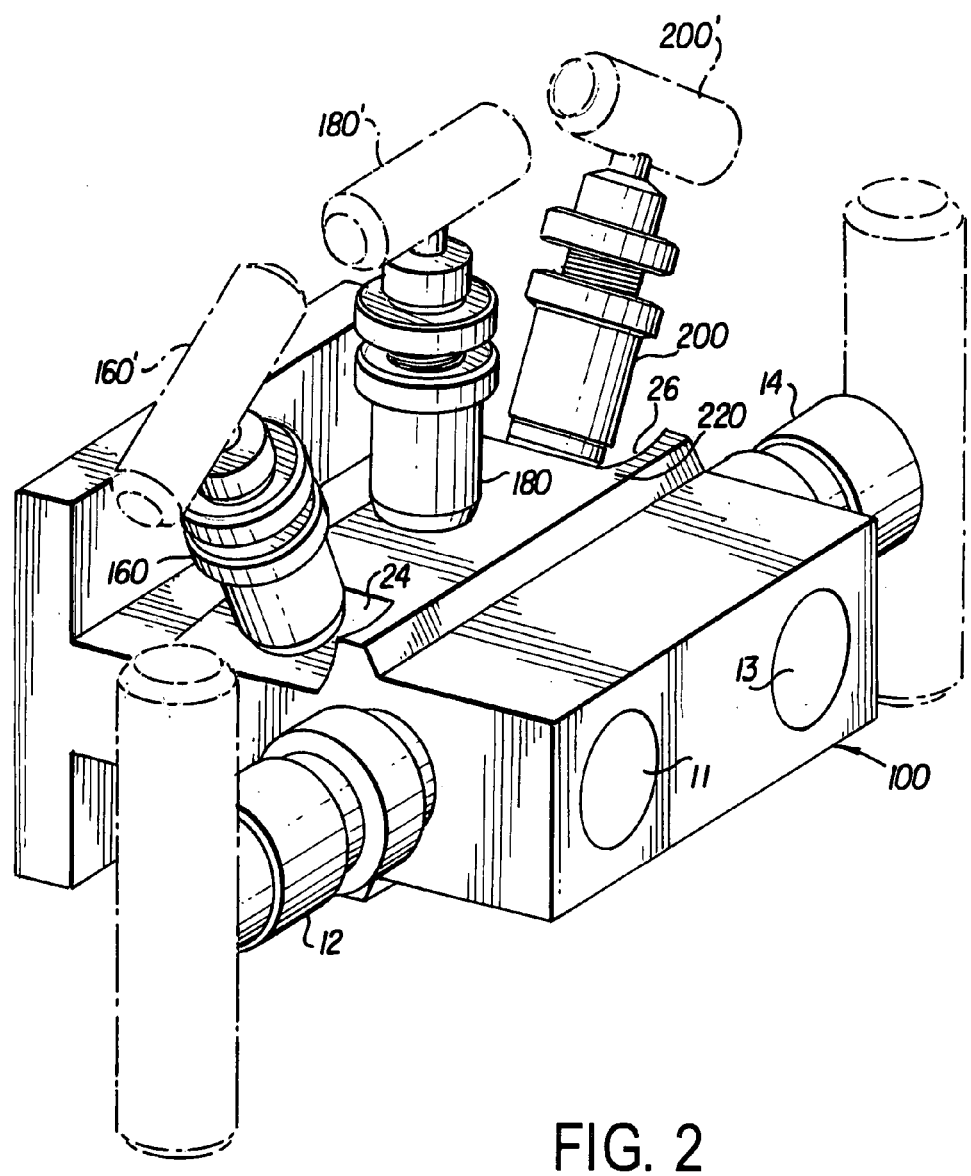
FIG. 2 schematically illustrates a perspective view of another embodiment of a five valve manifold of the flange by pipe type having a generally "T-shape"
Figure 4A:
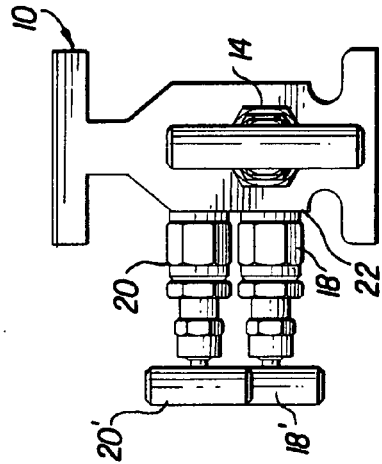
FIG. 4a is a right side view of the prior art manifold of FIG. 4.

The invention disclosed in the embodiments of FIGS. 1 and 2 show embodiments of the invention wherein two of these three valves 160, 180, 200 located on surfaces 24, 26 angled off the front face 220 of the manifold body 100. This permits the handles 160', 180', 200' to be separated allowing for both larger handles and more access room for hand operation. This makes operation of these valves 160, 180, 200 both easier and more convenient.

It will be apparent from the foregoing that many other variations and modifications may be made to the invention described herein without departing from the essential concept of the invention. Accordingly, it should be clearly understood that the embodiments of the invention disclosed herein are exemplary only and not intended as limitations on the scope of the present invention.

The invention claimed is:

1. A multivalve manifold comprising a generally I-shaped body, said I-shaped body defining a periphery, said periphery comprising a generally planar front face; a series of five valves placed about the periphery of said body;

three of said valves being located on the front face; each of said valves having a hand adjustable handle; and at least one of said three valves being positioned normal to said generally planar front face;

the face having at least one surface thereon angled from the generally planar front face such that at least one of said series of three valves when positioned on said surface is not normal to said generally planar face.

2. A multivalve manifold comprising a generally T-shaped body, said T-shaped body defining a periphery, said periphery comprising a generally planar front face; a series of five valves placed about the periphery of said body;

three of said valves being located on the front face; each of said valves having a hand adjustable handle; and at least one of said three valves being positioned normal to said generally planar front face;

the face having at least one surface thereon angled from the generally planar front face such that at least one of said series of three valves when positioned on said surface is not normal to said generally planar face.

3. The multivalve manifold of claim 1, wherein the front face comprises two surfaces therein such that at least two of said series of three valves when positioned on said surfaces are not normal to said generally planar face.

4. The multivalve manifold of claim 1, wherein said series of three valves comprise valves selected from the group consisting of equalizer and vent valves.

5. The multivalve manifold of claim 4, further comprising two block valves positioned on the periphery of said body.

6. The multivalve manifold of claim 4, wherein there are two equalizer valves and one vent valve.

7. The multivalve manifold of claim 4, wherein there are two vent valves and one equalizer valve.

8. The multivalve manifold of claim 6, further comprising two block valves positioned on the periphery of said body.

9. The multivalve manifold of claim 7, further comprising two block valves positioned on the periphery of said body.

10. The multivalve manifold of claim 2, wherein the front face comprises two surfaces therein such that at least two of said series of three valves when positioned on said surfaces are not normal to said generally planar face.

11. The multivalve manifold of claim 2, wherein said series of three valves comprise valves selected from the group consisting of equalizer and vent valves.

12. The multivalve manifold of claim 11, further comprising two block valves positioned on the periphery of said body.

13. The multivalve manifold of claim 11, wherein there are two equalizer valves and one vent valve.

14. The multivalve manifold of claim 11, wherein there are two vent valves and one equalizer valve.

15. The multivalve manifold of claim 13, further comprising two block valves positioned on the periphery of said body.

16. The multivalve manifold of claim 14, further comprising two block valves positioned on the periphery of said body.

17. The multivalve manifold of claim 1, wherein the spacing between high and low pressure passages is $2\frac{1}{8}$ inch, center to center.

18. The multivalve manifold of claim 2, wherein the spacing between high and low pressure passages is $2\frac{1}{8}$ inch, center to center.

19. The multivalve manifold of claim 4, wherein the spacing between high and low pressure passages is $2\frac{1}{8}$ inch, center to center.

20. The multivalve manifold of claim 11, wherein the spacing between high and low pressure passages is $2\frac{1}{8}$ inch, center to center.

* * * * *